United States Patent
Kankkunen et al.

(10) Patent No.: US 7,712,713 B2
(45) Date of Patent: May 11, 2010

(54) FASTENING MEANS FOR A PATIENT MONITOR

(75) Inventors: Jukka Kankkunen, Vantaa (FI); Kimmo Frondelius, Helsinki (FI); Janne Lampinen, Espoo (FI)

(73) Assignee: General Electric Company, Schenectady, NY (US)

( * ) Notice: Subject to any disclaimer, the term of this patent is extended or adjusted under 35 U.S.C. 154(b) by 226 days.

(21) Appl. No.: 11/425,877

(22) Filed: Jun. 22, 2006

(65) Prior Publication Data

US 2006/0290515 A1 Dec. 28, 2006

(30) Foreign Application Priority Data

Jun. 23, 2005 (EP) .................................. 05105607

(51) Int. Cl.
*A47B 96/06* (2006.01)
(52) U.S. Cl. .................................. 248/220.21; 248/214
(58) Field of Classification Search ............ 248/220.21, 248/226.12, 226.11, 230.4, 230.3, 65, 187.1, 248/125.7, 229.12, 214
See application file for complete search history.

(56) References Cited

U.S. PATENT DOCUMENTS

| | | | | |
|---|---|---|---|---|
| 1,266,367 | A * | 5/1918 | Wilson .......................... 5/646 |
| 2,179,251 | A * | 11/1939 | De Right et. al. ...... 248/229.12 |
| 2,589,520 | A | 3/1952 | Wallenius |
| 2,915,096 | A | 12/1959 | Mooney |
| 4,278,246 | A | 7/1981 | Blake et al. |
| 4,640,481 | A * | 2/1987 | Kohno ........................ 248/126 |
| 4,929,973 | A | 5/1990 | Nakatani |
| 4,964,603 | A * | 10/1990 | Yair ......................... 248/230.5 |
| 4,969,616 | A * | 11/1990 | Apperson et al. ............. 248/63 |
| 6,149,112 | A | 11/2000 | Thieltges et al. |
| 6,196,504 | B1 * | 3/2001 | Lemke .................... 248/187.1 |
| 6,450,465 | B1 * | 9/2002 | Eslick ..................... 248/230.4 |
| 6,799,607 | B1 * | 10/2004 | Friedline et al. ............ 138/106 |
| 7,090,416 | B2 * | 8/2006 | Mootz et al. ................ 396/421 |
| 7,152,834 | B2 * | 12/2006 | Hsu ......................... 248/230.1 |
| 7,241,060 | B2 * | 7/2007 | Mootz et al. ................ 396/421 |
| 2007/0034752 | A1 * | 2/2007 | Weger et al. ................. 248/56 |

FOREIGN PATENT DOCUMENTS

| | | |
|---|---|---|
| DE | 36 00 643 A1 | 7/1987 |
| WO | WO 01/15285 A | 3/2001 |
| WO | WO 2005/033524 A | 4/2005 |

* cited by examiner

*Primary Examiner*—Amy J Sterling
(74) *Attorney, Agent, or Firm*—Global Patent Operations; Jonathan E. Thomas

(57) ABSTRACT

A fastening means for a patient monitor, comprising a clamp member to be fastened to a supporting structure, a base member for supporting the patient monitor, the clamp member comprising two legs with free ends and a slot between the two legs, and a tightening means between the two legs for fastening the clamp member against the support surface placed between the two legs. The slot is wider at the bottom end than at the area between the free leg ends, and the fastening means is an electrically non-conductive element between the patient monitor and the supporting structure.

13 Claims, 3 Drawing Sheets

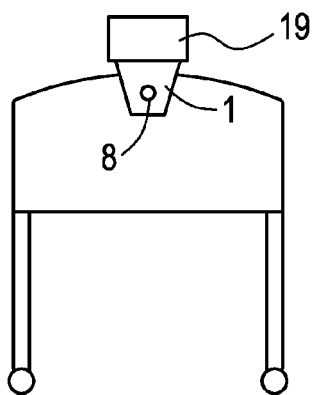
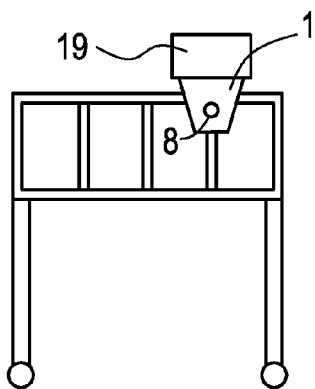
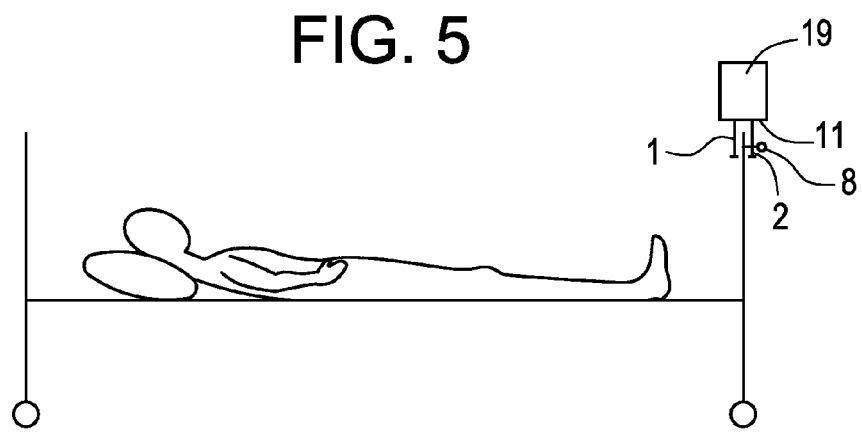
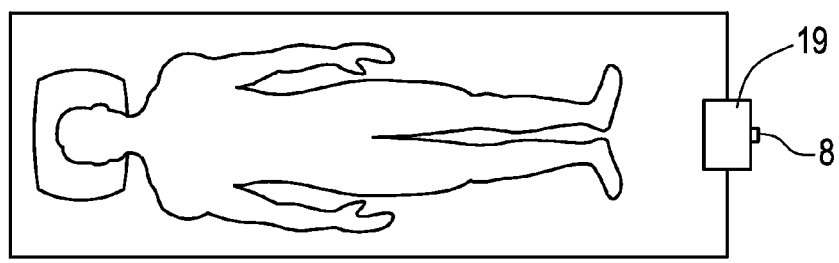
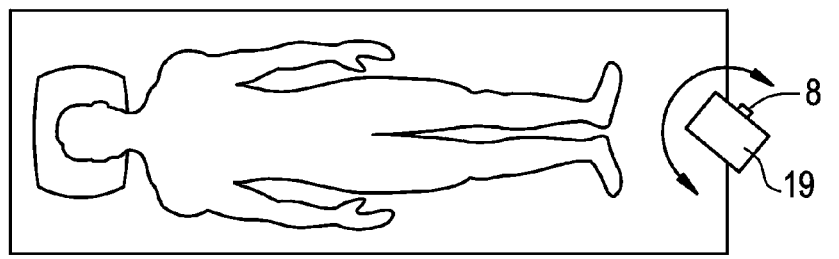

FASTENING MEANS FOR A PATIENT MONITOR

The invention relates to a fastening means for a patient monitor, comprising a clamp member to be fastened to a supporting structure, a base member for supporting the patient monitor, the clamp member comprising two legs with free ends and a slot between the two legs, and a tightening means between the two legs for fastening the clamp member against the support surface placed between the two legs.

Patient's condition is monitored in hospitals by using a patient monitor gathering vital medical information from the patient in question and displays said information on a screen and alerts medical staff if any undesirable situations occur. The monitor gathers many different parameters from the patient, e.g. ECG, NIBP, oxygen saturation, respiratory gases and invasive pressures etc. The number of parameters to be gathered may depend on for example the situation at hand etc.

The monitor is often placed near to the patient's bed so that cables can be connected to the patient. In practice the monitor is very often placed on a table, which is placed near to the bed or fastened to the bed by using different fastening elements.

These traditional solutions have a common disadvantage. Said common disadvantage is that problems occur when the patient is moved for example to another room or the fastening elements or the monitor itself disturb the patient and/or the staff and may even cause dangerous situations.

The traditional solutions are materialized in several ways. Some basic ways and their disadvantages are described below.

The monitor can be fastened to the patient's bed by using a supporting element, which is fastened to the end frame of the bed by using hooks so that the monitor lies inside the bed and the screen faces to the patient. Said supporting element is often totally or at least mainly of metal construction. The problem in this embodiment is that the monitor disturbs the patient's legs and also the staff and if the monitor somehow breaks there is a possibility that the patient can be in contact with electrically conducting parts. Normally the monitor is not fastened to the supporting element but the monitor merely lies on the supporting element, and therefore there is always a risk for falling when the bed is moved. It is also very difficult to change the view angle of the monitor. The need for changing the view angle is often rather strong because the monitor is normally in a too much upwards-facing direction whereby for example lights may cause considerable reflections on the screen making practical difficulties to the medical staff.

The monitor is also very often simply placed in the bed so that the monitor lies between the patient's legs. This solution is simple because no extra equipment is needed, but however the solution is not so practical because the monitor is sometimes very disturbing to toe patient, especially if the patient is a tall person. There might also be considerable heat problems, i.e. temperature of the monitor rises, and there is also clear risk for electric shocks if the monitor is damaged. It is also very difficult to control the view angle.

The monitor can also be placed on the table fastened to the bed end structure. The disadvantage in these solutions is that the monitor lies loosely on the table causing considerable risks when the bed is moved. The table is sometimes rather large causing problems during movements. The view angle is also not so easily controlled.

The monitor can also be fastened to an intravenous dripping stand fastened to the bed or placed near to the bed. This solution is not so practical because the stands used are light-weight structures and not so stable and the patient monitors are sometimes pretty heavy. Mounting is also rather difficult and because the monitor must be lifted up and held there so long that fastening elements are tightened. View angle control is also problematic in this solution.

The monitor used can also be provided with integrated fasteners. Said integrated fasteners are normally placed at the rear side of the monitor whereby the monitor is rather cumbersome in handling. Integral fasteners can very often be used with bed ends made of pipes only, and because of lack of insulation there is also a risk for electric shocks if the monitor is damaged. View angle control is in practice nearly impossible in this solution.

Referring generally to the known solutions described above it can be said that the known solutions are disturbing to the patient and also to the staff. There are also considerable safety risks relating to eventual monitor damages.

The object of the invention is to obtain a fastening means that eliminates the disadvantages of the prior art. This is achieved with the fastening means of the invention, which is characterized in that the slot is wider at the bottom end than at the area between the free leg ends, and that the fastening means is an electrically non-conductive element between the patient monitor and the supporting structure.

The advantage of the invention is that view angle control problems occurring in the prior art, are completely eliminated. The present invention eliminates also electrical safety risks relating to eventual damages of the monitor. The invention is also very advantageous because the monitor is not placed into the bed. The invention is very safe during transportation of the patient, and the offers very good view to the screen also during the transport. The invention can be used nearly in all patient bed types. The fastening means of the invention is also rather small and light, and can therefore very easily be moved for example to another bed and also very easy to keep in storage. The invention is also very safe as regards safety in mechanical fastening, i.e. friction properties are good even if light tightening is used. The invention is also very practical because the clamp can be fastened for example to a bed end without any risks for causing damages, e.g. scratches to the bed end materials.

In the following the invention will be described in detail by means of an embodiment shown in the accompanying drawing, in which FIG. 1 shows the embodiment in an explosion view, FIG. 2 shows the embodiment in the longitudinal direction of the slot.

FIG. 3 shows the embodiment shown in FIGS. 1 and 2 fastened to a patient's bed,

FIG. 4 shows the embodiment shown in FIGS. 1 and 2 fastened to an another type of bed, FIG. 5 shows a side view of a bed provided with the embodiment shown in FIGS. 1 and 2 and a patient monitor, FIG. 6 shows an another view of the bed shown in FIG. 5 and FIG. 7 shows view shown already in FIG. 6 but with possibilities how the view angle of the monitor can be changed.

Figure 1:
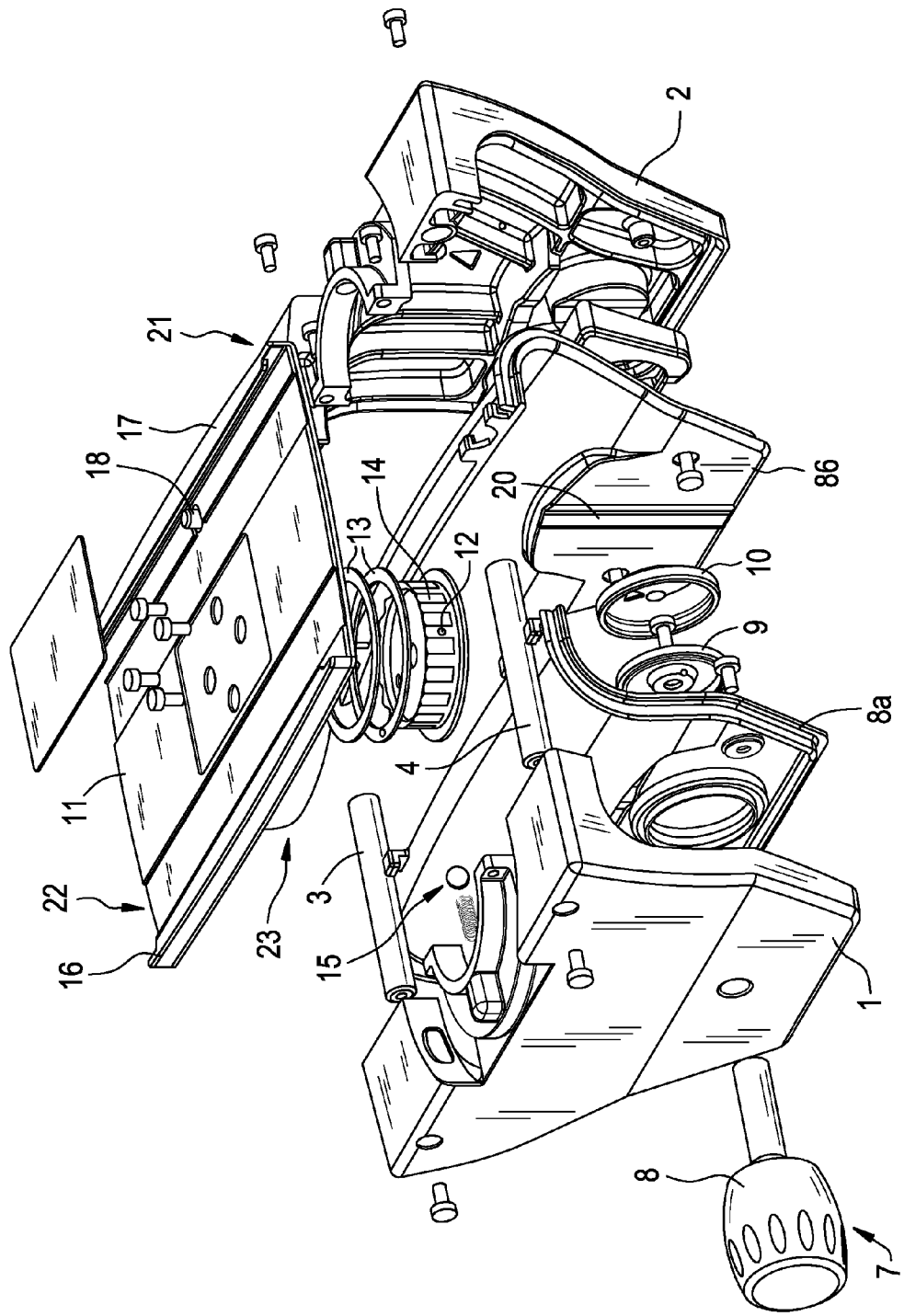

FIG. 1 shows basic parts of the fastening means of the invention. The fastening means comprises two components, i.e. halves 1, 2 joined together so that there are two reinforcing pins 3, 4 extending over the joint between the two components. The components 1, 2 are preferably made of cast aluminium material and the reinforcing pins are preferably made of stainless steel material. It is also quite possible to use other materials, for example components 1,2 can be made of titanium or magnesium etc.

Figure 2:
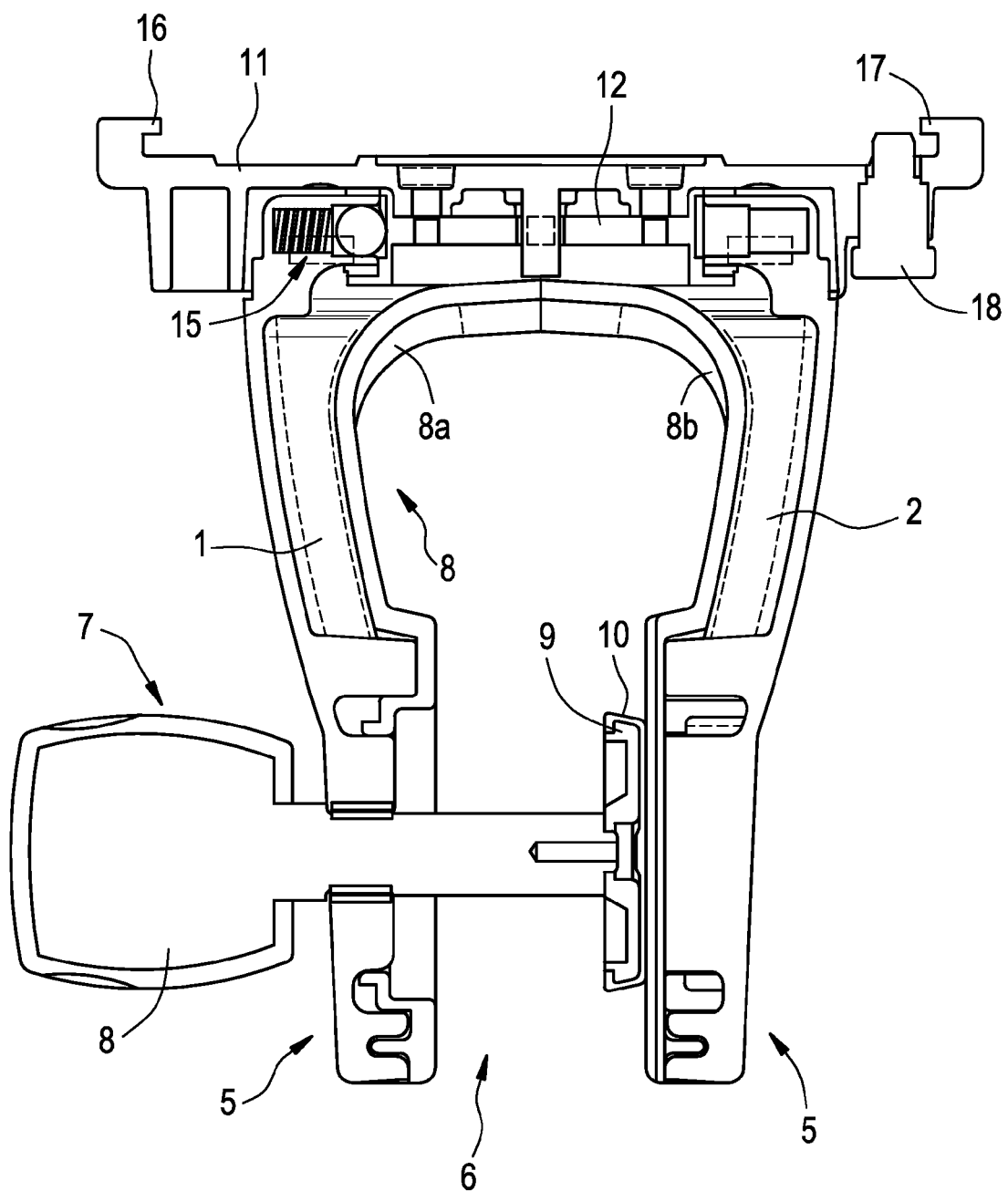

Said two components 1, 2 form a clamp member comprising two legs 5 with free ends and a slot 6 between the legs as shown in FIG. 2. There is also a tightening means 7 for fastening the clamp member against a support structure, for example an end wall of a patient's bed. Said tightening means can be any appropriate means, for example screw means etc. It is also possible to use several tightening means if needed instead of one as shown in the figures. The embodiment shown in the figures comprises a hand operated screw member 8 and a tightening surface element 9. It is also possible to materialize the tightening means so that the tightening means comprises a mechanism preventing over tightening or/and enabling limiting tightening force to a certain predetermined limit. The slot 6 is wider at the bottom end than at the area between the free leg ends. Their feature is clearly shown for example in FIG. 2. The bottom surface of the slot is also arcuate so that the middle most portion of the slot is deeper that the side portions of the slot. This feature is clearly shown in FIG. 1. Said two feature lead to good fastening properties as described later.

The clamp member formed by said two components 1, 2 is provided with an insulating material layer 8 on the slot surface. Said insulating material layer is formed of two halves 8a, 8b provide on the surfaces of the components 1, 2 as shown in FIGS. 1 and 2. The insulating material can be any material having appropriate insulating properties, for example plastic or/and rubber material can be used. It is also preferable that the insulating material used is a high-friction material in order to have good mechanical fastening properties. In the embodiment shown also the tightening surface element is provided with insulating material layer piece 10. It is however possible to make the element 9 of an insulating material.

The fastening means comprises further a base member 11 for supporting a monitor. The base member 11 is made of a reinforced plastic material. It is preferable that the base member is turnably mounted on the clamp means by using a turning element 12 and ring elements 13. Said ring elements, made for example of teflon, act as bearings and also as locking elements when pressed against each other preventing unintentional turning movement of the monitor. Said locking effect is important for example in a situation when a nurse or a doctor is using pushbuttons of the monitor. Without any locking effect the monitor may very easily turn unintentionally when pushbuttons are used causing delays in work because the monitor must be turned back to its original position before the screen can be seen properly etc.

In the embodiment of FIG. 1 the base member 11 can be turned or rotated around a vertical axle with respect to the clamp member. It is also possible to provide the device with a mechanism enabling tilting movement of the base member 11 if needed. The turning element 12 is provided with recesses 14 on its outer periphery on order to obtain stepwise turning action by using for example a spring loaded locking element 15 co-operating with said recesses. Said locking element can also be based on other principles, for example on the elasticity properties of the material used. The base member 11 can be formed to a smooth-lined element, i.e. reinforcement to correct portions and without ant sharp edges so that the structure is durable and risks caused by sharp edges and corners are eliminated. It must also be noted that the base member 11 can be fastened to the clamp member without any turning mechanism, i.e the fastening means of the invention can be materialized without turning feature if there is a need for simplified and a very robust embodiment.

As described above the clamp member and/or the base member are both electrically non-conducting elements so that the entire fastening means forms an electrically non-conductive element between the patient monitor and the supporting structure.

The base member 11 is provided with means for attaching the monitor to the base member 11. In the embodiment shown in the figures said means are formed by two parallel flanges 16, 17 running along the opposite sides of the base member 11 so that there is a distance between said two flanges 16, 17. There is also a pin member 18 in the area of at least one of the flanges acting transversely with respect to the flange. The monitor can be attached to the base member by sliding the monitor sideways so that corresponding parts of the monitor slide under that flanges and the sliding movement can be stopped by using the pin member to act together with a corresponding element, i.e. a hole in the bottom surface of the monitor. The means for attaching the monitor shown in the figures is not the only possibility but also other means can be used to for said purpose, for example screw means, eccentric tightening elements etc. can be alternatively used. It is also possible to provide small flat areas 21 to the corners of the base member so that the monitor can be placed onto the base member before sliding the monitor sideways. Said small flat areas make things easier because the monitor need not be wholly supported by hand at the beginning of the sliding step. The base member 11 can also be provided with recesses 22 for the supporting feet of the monitor. The base member 11 need not be a plate formed element as shown in FIG. 1. The base member 11 can also be any appropriate component having some kind of means for attaching the monitor, i.e. a frame component having pins penetrating to holes provided to the monitor or a frame component being provided with appropriate snap connection etc.

Base member 11 can also be provided with a protective means 23 for preventing cables to slide between the base member 11 and components 1 and 2 forming the clamp member when the base member is turned with respect to the clamp member.

The structure shown in FIGS. 1 and 2 enables all of the advantages described earlier.

FIG. 3 shows principally how the fastening element and the monitor can be fastened to the supporting structure, e.g. to a bed end. The monitor is shown with the reference number 19. FIG. 4 shows the same situation as shown in FIG. 3, the only difference being that in FIG. 4 a different type of the bed is shown. In FIG. 3 a bed with plate formed end is shown and in FIG. 4 a bed with pipe-structure end is shown. In order to enable the use with the pipe formed bed ends the surfaces of the legs 5 facing against the tightening surface element 9 is provided with an elongated recess 20 extending along the length of the leg. Said recess 20 enable firm contact between a pipe and the clamp as shown in FIG. 4. It is naturally also quite possible to make a corresponding recess on the surface of the tightening element 9 too.

FIG. 3 shows also that because of the fact that bottom surface of the slot 6 arcuate in the longitudinal direction so that the slot is deeper at the middlemost portion than at the side portions of the slot, the clamp can be fastened very firmly to a bed end having an arcuate end wall edge as shown in FIG. 3. Arcuate bottom surface of the slot enables advantageously also firm fastening to a bed end wall having straight-lined wall edge because the side portions of the slot bottom surface are bearing against the edge, i.e. there are advantageously two contact points between the slot bottom and the edge of the bed end wall. High-friction insulating material helps also to obtain a good mechanical strength for the joint between the clamp and the bed end wall.

FIG. 5 shows in a side view how the monitor can be attached to the bed by using the invention. Because of the fact that the slot 6 is wider at the bottom end than at the area between the free leg ends the clamp always takes a correct position, i.e. the position in which the base member 11 is horizontal, when the tightening means 7 is tightened. In FIG. 5 the screen of the monitor is facing to the patient. FIG. 6 shows the bed shown in FIG. 5 but seen from above. The screen of the monitor 19 can be seen when looking to the monitor from the head end of the bed. FIG. 7 shows how the view angle of the monitor can be changed by turning the monitor 19. The turning movement of the monitor is shown with an arrow in FIG. 7. The view angle of the monitor is very important in practice because the medical staff must see the screen for example in the situation when they carry out something at the head end of the bed, i.e. the screen must be seen when standing beside the patient's head. It is also important that the screen is seen when the patient is for example moved somewhere by pushing the bed, i.e. the screen must be seen when walking after the bed etc. The screen must also be seen accurately when carrying out something and standing beside the bed. The present invention offers a simple solution for the staff to monitor the patient's condition continuously without unpractical and steps in different situations.

The embodiment described above is by no means intended to limit the invention, but the invention may be modified completely freely within the scope of the claims. Thus it is obvious that the details need not be exactly identical with those shown in the figures and described in the text, but other solutions are also possible.

The invention claimed is:

1. Fastening means for fastening a patient monitor to a supporting structure, the fastening means comprising:
    a clamp member to be fastened about a supporting structure, the supporting structure being situated between two legs of said clamp member;
    tightening means for fastening said clamp member against the supporting structure, said tightening means extending through only one of said legs to fasten the supporting structure against the other of said legs;
    said two legs facing each other to form a slot between said two legs, said slot being wider at a bottom end than at an area between said two legs;
    a base member for supporting the patient monitor;
    a turning element and a locking element for mounting said base member to said clamp member, wherein said base member can be turned or rotated around a vertical axle with respect to the clamp member,
    wherein the clamp member comprises a plurality of reinforcing pins that adjoin the legs at a joint that forms the slot between the lens that receives the support structure therein,
    wherein the turning element is secured at the joint between the lens so that the base member rotates about the vertical axis in a plane that is perpendicular to the legs of the clamp member,
    wherein an outer periphery of the turning element is configured with a plurality of recesses that cooperate with the locking element to prevent turning movement of the base member,
    wherein the tightening means comprises a screw member and a tightening surface element configured with an insulating material that is coupled to the screw member so that actuation of the screw member in a direction perpendicular to the supporting structure in the slot translates the insulating material inside of the slot so as to place the supporting structure in contact with the insulating material and one of a pair of insulating material layers disposed on a surface of the legs inside of the slot, and
    wherein the patient monitor is electrically isolated from the supporting structure.

2. The fastening means of claim 1, wherein the base member comprises a frame component having pins that penetrate to holes in the patient monitor.

3. The fastening means of claim 1, wherein the bottom surface of the slot proximate the joint is arcuate in the longitudinal direction of the slot so that the middlemost portion of the slot is deeper than the side portions of the slot.

4. The fastening means of claim 1, wherein the tightening means comprises an insulating material layer piece coupled to the tightening surface element, and wherein the insulating material layer piece contacts the supporting structure.

5. The fastening means of claim 1, wherein the joint comprises an arched joint for receiving the support structure.

6. The fastening means of claim 1, wherein each of the legs of the clamp member comprises aluminum.

7. The fastening means of claim 1, wherein the base member comprises reinforced plastic material.

8. The fastening means of claim 1, wherein the tightening means comprises a mechanism that prevents over tightening or that limits a tightening force to a predetermined level.

9. The fastening means of claim 1, wherein the insulating material layers comprise one or more of plastic and rubber material.

10. The fastening means of claim 1, wherein the insulating layer materials comprise high-friction material.

11. The fastening means of claim 1, wherein the spring loaded locking element provides a spring force perpendicular to the axis of rotation of the turning element.

12. The fastening means of claim 1, wherein the locking means comprises a pair of parallel flanges that extend longitudinally along opposite edges of the base member, and a pin member provided at least in the area of at least one of the flanges, wherein the patient monitor slides under the flanges, and wherein the pin member prevents the patient monitor from sliding in the flanges.

13. The fastening means of claim 1, wherein the surface of the leg facing the tightening surface element comprises an elongated recess extending along the length of the leg.

* * * * *